United States Patent Office 2,804,352
Patented Aug. 27, 1957

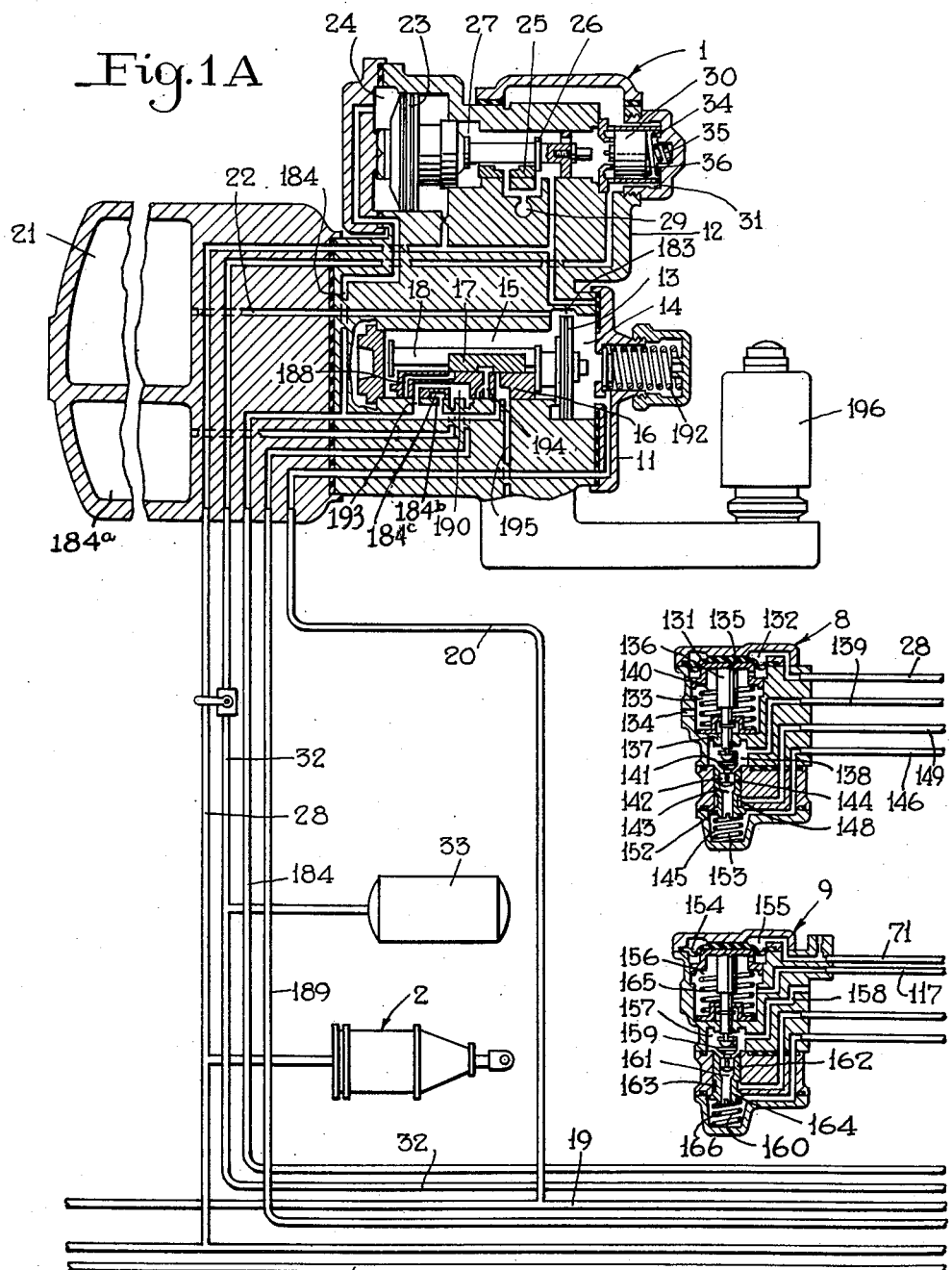

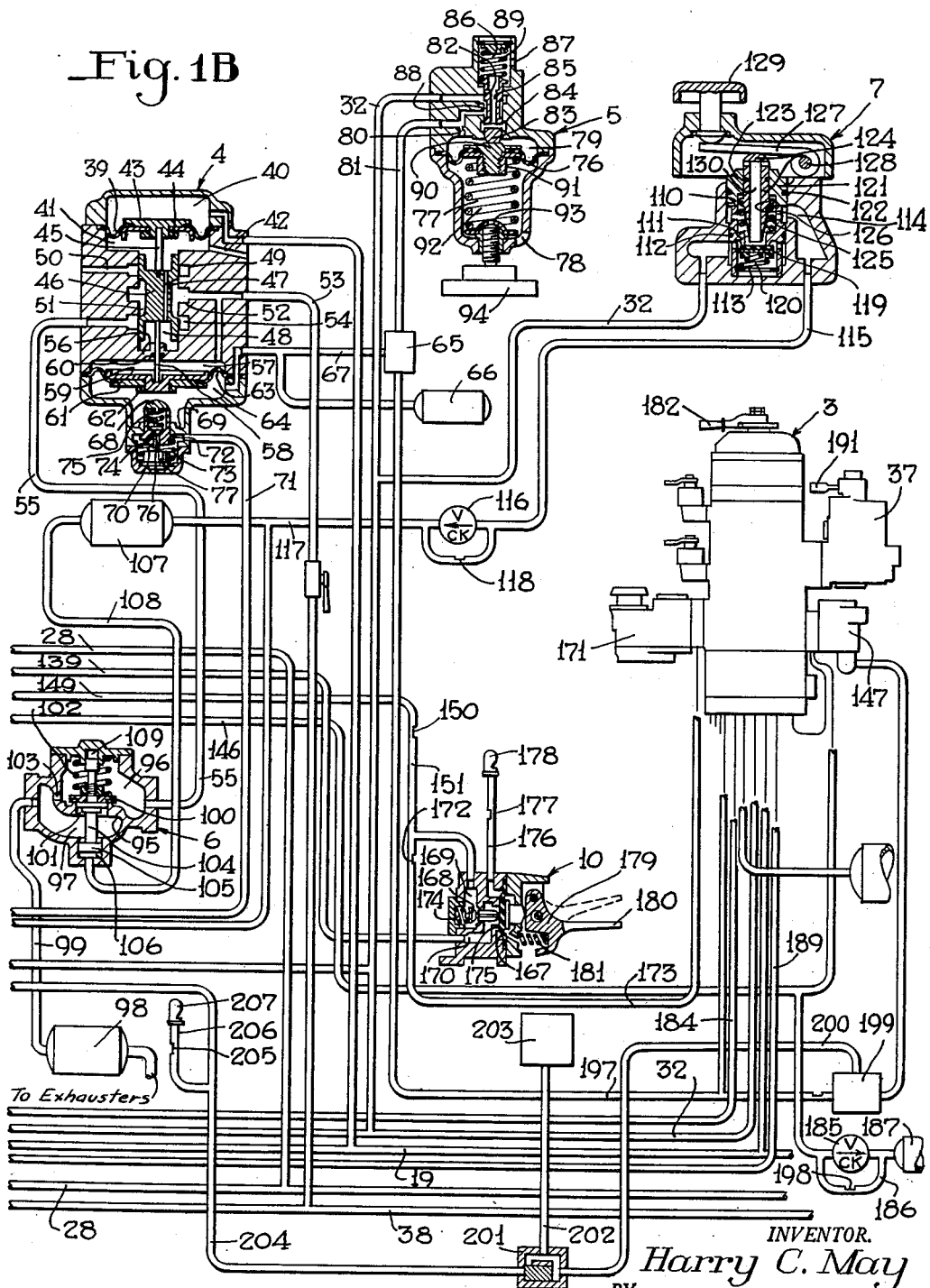

2,804,352

PRESSURE AND VACUUM BRAKE SYSTEMS INTERLOCK APPARATUS

Harry C. May, East McKeesport, Pa., assignor to Westinghouse Air Brake Company, Wilmerding, Pa., a corporation of Pennsylvania Application February 23, 1955, Serial No. 490,089

10 Claims. (Cl. 303—4)

This invention relates to combined automatic compressed air and vacuum operated brake equipment for railway locomotives and more particularly to a railway locomotive brake equipment which is operated by an automatic compressed air system and may serve as pilot control for a train of vehicles equipped with vacuum brakes.

This invention is particularly adapted for use on "switcher" type locomotives which are used in places where it is required to move cars equipped with fluid pressure brakes of the automatic type and cars equipped with vacuum type brakes. Some switcher type locomotives are equipped with locomotive fluid pressure brake equipment having an independent brake valve for controlling same and a separate automatic vacuum brake valve for controlling the vacuum brakes on the cars being moved. Other switcher type locomotives use brake equipment of the conventional pressure type standard on railroads in the United States which includes an automatic brake valve such as the H-6 and a conventional independent brake valve with the addition of a vacuum control valve mechanism responsive to variations in brake pipe pressure, effected by the engineer's automatic brake valve, to vary the pressure in a vacuum train pipe to obtain application and release of the vacuum operated brakes on the cars corresponding to the application and release of the fluid pressure brakes on the locomotive. It is to an improved locomotive brake equipment of the latter mentioned type that this invention relates, and specifically to an improved vacuum control valve device comprising a pair of connected diaphragms subject to brake pipe pressure and sub-atmospheric vacuum train pipe pressures balanced against a reference pressure adapted to be maintained at a substantially constant pressure by a regulating valve. Arranged between said diaphragms for operation thereby is a valve which is adapted to be moved to an application position to connect atmosphere to vacuum train pipe in response to a reduction in brake pipe pressure and to be moved to a release position to connect a vacuum reservoir to the vacuum train pipe. Means are also provided in the vacuum control valve device to obtain a rapid movement of the valve device to application position when an emergency application of brakes on the locomotive is effected. Additional valve means are provided for selectively effecting a quick release of the vacuum brakes on the cars of the train. This valve means is also selectively operable to suppress an automatic application of the vacuum train brakes instituted from the train, such as that caused by a train separation so that the train may be operated a short distance to a repair shop. Diaphragm foot valve means are also provided for effecting a safety control application of the vacuum train brakes upon release of physical pressure from the foot valve means with provisions for suppressing the safety control application when a predetermined degree of brake cylinder pressure is effective.

It is the principal object of the invention, therefore, to provide an improved locomotive fluid pressure brake equipment of the type described above which may be adapted to control the brakes on a train of vehicles having either vacuum operated or automatic fluid pressure operated brakes.

Another object of the invention is to provide improved means in a brake equipment of the above type which will respond more quickly to a reduction in brake pipe pressure to effect an automatic vacuum application of the brakes on the train more quickly than other devices known heretofore have obtained.

Another object of the invention is to provide means in an equipment of the above type for suppressing a vacuum brake application in the train resulting from a separation of the vacuum train pipe in order to permit limited movement of the train for repairs or the like.

Another object is to provide means in an equipment of the above type for obtaining a quick release of the vacuum operated brakes on cars in a train.

Another object of the invention is to provide means in an equipment of the above type for effecting an automatic service brake application of the vacuum brakes on the train upon failure of the operator of the locomotive to keep a safety control device in an "alert" position.

Other objects and advantages will appear from the following detailed description of the invention.

In the accompanying drawings; Figs. 1A and 1B, where the right-hand side of Fig. 1A is matched to the left-hand side of Fig. 1B, constitute a diagrammatic view, partly in section and partly in outline, of a fluid pressure brake apparatus embodying the invention.

DESCRIPTION

As shown in the drawing, the improved brake apparatus comprises a distributing valve device 1 arranged to control a brake cylinder device 2 and to be controlled by an automatic brake valve device 3, a vacuum control valve device 4, a regulating valve device 5, a vacuum release valve device 6, a quick release control valve device 7, a suppression valve device 8, a protection valve device 9 and a safety control foot valve device 10.

The distributing valve device 1 comprises an equalizing portion 11 and an application and release portion 12, the equalizing portion comprising a piston 13 operably mounted in a suitable bore in a casing and dividing said bore into a control chamber 14 at one side and a valve chamber 15 at the other side. Contained in valve chamber 15 is a main slide valve 16 and an auxiliary slide valve 17, both arranged to be operated by the piston 13 through the medium of a stem 18. The chamber 14 is connected to a brake pipe 19 by way of a passage and pipe 20 while valve chamber 15 is connected to a pressure reservoir 21 by way of a passage 22.

The application and release portion 12 comprises a piston 23 mounted in an application cylinder 24 so as to operate a brake cylinder exhaust slide valve 25 through the medium of a piston stem 26, contained in a valve chamber 27 at the opposite side of piston 23 to said application cylinder. The valve chamber 27 is constantly connected with the brake cylinder device 2 by way of a passage and pipe 28, while the slide valve 25 controls communication between the valve chamber 27 and an atmospheric exhaust passage 29.

The application and release portion 12 further comprises a supply valve device indicated generally by the reference numeral 30, and mounted in a chamber 31 which is constantly connected by way of a passage and pipe 32 with a main reservoir 33. The supply valve device 30 is yieldingly pressed by means of springs 34 and 35 into engagement with an annular seat rib 36 surrounding an opening to the valve chamber 27. The end of the stem 26 is adapted to engage the supply valve device 30 to move this valve device away from seat rib 36 against the springs 34 and 35 to thereby permit the supply of fluid under pressure from reservoir 33 to flow to valve chamber 27, and thence by way of passage and pipe 28 to brake cylinder device 2.

The automatic brake valve device 3 is shown in outline in Fig. 1B of the drawings because a complete illustration and description is deemed unnecessary, since the automatic brake valve device is a well-known part of the usual automatic fluid pressure brake equipment such as that shown and described in Instruction Pamphlet No. 5032 for No. 6-ET Locomotive Brake Equipment published by the Westinghouse Air Brake Company, Pittsburgh, Pa. By means of this brake valve device a train of cars equipped with automatic fluid pressure brakes, as well as the brakes on the locomotive, may be controlled in the usual manner described in the aforesaid pamphlet. It will be understood that when the brake pipe pressure is reduced by operation of the automatic brake valve device 3, the equalizing portion 11 of the distributing valve device 1 is operated to supply fluid under pressure to the application cylinder 24. The brakes may be applied and released on the locomotive independently of the train brakes by operating an independent brake valve device 37 to supply and release fluid under pressure from the application cylinder 24 as will appear more fully later.

The vacuum control valve device 4 is provided for the purpose of varying the pressure in a vacuum train pipe 38 in accordance with the variations in pressure in brake pipe 19 to thereby control the vacuum brakes on the cars of a train in accordance with the operation of the fluid pressure brake valve device 3 to control the fluid pressure brakes on the locomotive. The vacuum control valve device 4 comprises a diaphragm 39 clamped about its periphery between two sections of a casing and defining therewith a control chamber 40 at one side, which chamber is connected to brake pipe 19, and at the other side a chamber 41 which is open to atmosphere through a vent port 42. Contained in chamber 40 is a diaphragm follower 43 which extends through a suitable central opening in diaphragm 39 and is clamped to said diaphragm by means of a nut 44 contained in chamber 41. A stem 45 formed integrally with follower 43 extends across chamber 41 and makes rigid connection with a cylindrically shaped slide valve 46 slidably mounted in a suitable bore in the casing. A longitudinal passage 47 formed in the valve 46 connects chamber 41 with a chamber 48 formed in the casing at the opposite end of said valve from chamber 41.

Formed in the casing about the upper end of slide valve 46 is an annular chamber 49 which is always open to atmosphere by way of a vent port 50 and may, at certain times which appear later, be connected through a cavity 51 in said slide valve to a similar annular chamber 52 which is always open through passage and pipe 53 to vacuum train pipe 38. Formed around the lower end of slide valve 46 in a manner similar to that of chamber 49 is an annular chamber 54 which is always connected to vacuum release valve device 6 through a passage and pipe 55 and may at certain times be connected to chamber 48.

Slidably mounted in a suitable opening in a partition wall 56 between chamber 48 and a chamber 57 is a stem 58 which is arranged to make abutting connection between the slide valve 46 and a diaphragm follower 59 contained in the chamber 57. The stem 58 is encircled by a sealing ring 60 mounted in the casing which prevents leakage of fluid under pressure between chambers 48 and 57, the latter being open to vacuum train pipe passage 53.

The diaphragm follower 59 is secured by means of a plate 61 and nut 62 to the center of a diaphragm 63 clamped at its periphery between two sections of the casing so as to define in part, the chamber 57 at one side and a chamber 64 at the other side, the latter chamber being connected to the outlet side of a double check valve device 65 and a volume reservoir 66 by way of a passage and pipe 67.

A hollow plunger 68 is slidably mounted in a partition wall 69 separating chamber 64 from a chamber 70 which is connected to the protection valve device 9 by way of pipe 71. In chamber 70 the plunger 68 is provided with an annular shoulder 72 which is arranged to engage the partition wall 69 so as to limit upward movement of the plunger in response to action of a spring 73 contained in said chamber. In the position so defined the plunger 68 extends into chamber 64 so that it may be engaged by follower 59 upon downward movement of diaphragm 63 from the position in which it is shown in the drawing. A valve 74 is operably mounted within the hollow plunger 68 for connecting chambers 64 and 70 and is constantly urged toward its seated position by a spring 75 contained in said plunger. The valve 74 is provided with a stem 76 which extends into chamber 70 where it may contact a seat 77 for spring 73 and unseat when the plunger 68 is moved downwardly by diaphragm follower 59 upon downward deflection of diaphragm 63.

The regulating valve device 5 comprises a casing having a diaphragm 76 clamped about its periphery between two sections of said casing and forming therewith a chamber 77 at one side, which is always open to atmosphere through a vent port 78, and at the other side a chamber 79 connected through a choke 80 to a passage and pipe 81 leading to an inlet side of double check valve device 65. Slidably mounted in a suitable bore 82 in the casing is a cylindrical slide valve 83 which defines in part a chamber 84 in said bore, which chamber may be open to atmosphere by way of a longitudinal bore 85 in said valve, a spring chamber 86 and a vent port 87, as shown in Fig. 1B of the drawings. As annular chamber 88 defined by the walls of bore 82 and a reduced portion of slide valve 83 intermediate its ends is arranged so as to connect pipe 32 leading from the main reservoir 33 to pipe 81 for supplying fluid under pressure to chamber 64 through check valve device 65 and pipe 67 and to chamber 79 through choke 80 for reasons which will appear more fully later. A spring 89 contained in chamber 86 urges slide valve 83 downwardly into contact with a follower 90 mounted centrally to diaphragm 76 by screw-thread means 91. A spring 92 mounted in chamber 77 between screw-thread means 91 and a spring seat 93 urges diaphragm 76 upwardly according to the adjustment of a regulating wheel 94 adjustably mounted in the casing.

The vacuum release valve device 6 comprises a casing having a partition wall 95 dividing said casing into an inlet chamber 96, which is always open to pipe 55 leading to vacuum control valve device 4, and an outlet chamber 97, which is always open to a vacuum reservoir 98 by way of a pipe 99. A valve 100 is operatively mounted in chamber 96 for controlling communication between chambers 96 and 97 through an opening 101 in wall 95 and is urged toward its seated position by a spring 102 contained in chamber 96. A choke 103 is provided in wall 95 to establish a relatively restricted, constantly open communication in by-passing relations to the opening 101. In chamber 97 a stem 104 is secured at one side to valve 100 and at its other end is rigidly connected to a piston 105 slidably mounted in a suitable bore in the casing and forming therein a chamber 106 which is open to a volume reservoir 107 by way of a pipe 108. In chamber 96 the outer end of the stem 104 is slidably guided in a suitable bore 109 formed in the casing.

The quick release control valve device 7 comprises a casing having a bore 110 in which is mounted a valve seat member 111 which makes sealing engagement with the wall of said bore through the medium of a sealing ring 112. The valve seat member 111 separates the bore 110 into a chamber 113 at one side of the member, which chamber is constantly connected to main reservoir pipe 32, and at the other side a chamber 114 which is connected to reservoir 107 by way of a passage and pipe 115, a check valve 116, and a pipe 117. A choke 118 is placed in bypassing relation to check valve 116. A valve 119 is provided in chamber 113 for operative engagement with valve seat member 111 and is urged toward its seated position by a spring 120 operatievly mounted in said chamber. The upper end of chamber 114 is closed by a closure member 121 which makes sealing engagement with the wall of bore 110 by means of a sealing ring 122. Slidably mounted in a central opening in closure member 121 and sealed therein by a sealing ring 123 is a plunger 124 arranged to unseat valve 119 upon downward movement against a spring 125 interposed between a skirt 126 on said plunger and valve seat member 111. The plunger 124 is arranged to be actuated downwardly through the medium of a lever 127, pivotally mounted at one end on a stud 128 anchored in the casing, upon the lever being rocked counterclockwise about said stud against the outer end of said plunger by a button 129 slidably mounted in the casing and engaging the outer end of said lever. In the normal position of plunger 124, in which it is shown in the drawing, a longitudinal passage 130 in said plunger is adapted to connect chamber 114 to atmosphere via the bore 110.

The suppression valve device 8 comprises a sectional casing, between two sections of which a diaphragm 131 is clamped about its periphery. At one side of diaphragm 131 is a control chamber 132 which is open to brake cylinder pipe 28 leading to the brake cylinder device 2 and at the other side is a spring chamber 133 which is open to atmosphere by way of a vent port 134. Contained in chamber 133 is a follower 135 for diaphragm 131 having a stem 136 which is slidably mounted in a partition wall 137 between the chamber 133 and a valve chamber 138 connected to the diaphragm foot valve device 10 by way of a passage and pipe 139. A spring 140 encircles the stem 136 and engages the follower 135 in such a manner as to constantly urge the follower and diaphragm 131 upwardly to the position in which they are shown in the drawing.

The stem 136 extends into valve chamber 138 where it is operatively linked to a valve 141 which is slidably guided by means of its fluted stem 142 in a coaxial bore 143 formed in a valve member 144 slidably mounted in the casing. Through this bore 143 communication may be established between chamber 138 and a chamber 145 which is connected through a safety control passage and pipe 146 to a brake application valve device 147 mounted on the brake valve device 3. Thus, communication through bore 143 in valve member 144 is controlled by movement of diaphragm 131 through the medium of follower stem 136 and the valve 141 to which it is connected.

The valve member 144, which is slidably mounted in a suitable bore in the casing of the valve device 8, takes part in defining intermediate its ends an annular chamber 148 in said bore, which chamber is connected to diaphragm foot valve device 10 by way of a passage and pipe 149, a choke 150 and a pipe 151. The valve member 144 comprises a valve 152 formed at the lower end of said member and adapted to cooperate with the casing to control communication between chambers 145 and 148. A spring 153 operatively mounted in chamber 145 between the casing and the valve member 144 constantly urges said valve member toward a normal position in which valve 152 is seated, as shown in Fig. 1A of the drawings. As will appear more fully later, fluid under pressure supplied to chamber 132 will act on diaphragm 131 with sufficient force to first overcome spring 140 to seat valve 141 and then to overcome spring 153 to unseat valve 152.

The protection valve device 9 may be the same, structurally, as valve device 8, having a diaphragm 154 with a control chamber 155 at one side and a spring chamber 156 at the other side. The control chamber 155 is connected to chamber 70 in the vacuum control valve device 4 by way of a pipe 71 while spring chamber 156 is open to pipe 117 leading to volume reservoir 107. A valve chamber 157, which is open to atmosphere through a vent port 158, contains a valve 159 which controls communication between said chamber and a chamber 160 by way of a bore 161 in a valve member 162 which corresponds to valve member 144 in valve device 8. The valve member 162 is encircled by an annular chamber 163 which is open to main reservoir pipe 32 and is provided at its lower end with a valve 164 which controls communication between chambers 160 and 163. A spring 165 contained in chamber 156 urges diaphragm 154 toward the position shown in Fig. 1A, in which valve 159 is unseated and a spring 166 contained in chamber 160 urges valve member 162 upwardly toward its normal position in which valve 164 is seated as shown in the drawing. As will hereinafter appear, fluid under pressure supplied to control chamber 155 will cause valve 159 to be seated and then valve 164 to be unseated as the fluid pressure acting on diaphragm 154 overcomes sequentially the opposing pressures of springs 165 and 166.

The safety control foot valve device 10 comprises a casing containing a flexible diaphragm 167 arranged to operate a valve 168 to control communication between an inlet chamber 169 and an outlet chamber 170. The inlet chamber 169 is connected to a feed valve device 171 by way of pipe 151, a choke 172 and a pipe 173 while the outlet chamber 170 is connected to the pipe 139 leading to chamber 138 in the suppression valve device 8. Contained in chamber 169 is a spring 174 which constantly urges valve 168 inwardly toward its seated position. The diaphragm 167 is further adapted to cooperate with a valve seat 175 to control communication between the outlet chamber 170 and an atmospheric vent through a passage and pipe 176, a choke 177 and a whistle 178 in such a manner that upon outward movement of said diaphragm under the action of spring 174 valve 168 is seated and said atmospheric vent is opened. A bell crank 179 is pivotally mounted in the casing for controlling the position of diaphragm 167 and is provided with a horizontally extending pedal 180 adapted when subject to foot pressure by the operator to move said diaphragm inwardly into sealing contact with valve seat 175 and to unseat valve 168. A spring 181 is interposed between the casing and the bell crank 179 for operating the bell crank upon release of foot pressure thereon in a direction to permit outward movement of said diaphragm.

*Operation—initial charging*

In operation, fluid under pressure is supplied to the main reservoir 33 and thence to the main reservoir pipe 32 in the usual manner. From pipe 32 fluid at main reservoir pressure is supplied to the feed valve device 171 mounted on the brake valve device 3. When a handle 182 of the brake valve device 3 is in running position, the feed valve device 171 operates to supply fluid under pressure to brake pipe 19 and to pipe 173 at a pressure, such as 70 pounds, normally carried in the fluid pressure brake pipe of the locomotive.

Fluid under pressure thus supplied to brake pipe 19 will flow by way of branch pipe 20 to control chamber 14 in the distributing valve device 1. In response to pressure of fluid in chamber 14 piston 13 will move to its release position in which it is shown in Fig. 1A. In release position of piston 13 fluid under pressure in chamber 14 will flow by way of a charging groove 183 to valve chamber 15 and thence through passage 22 to pressure chamber 21 to charge same to brake pipe pressure. In running position of brake valve handle 182 application cylinder 24 of the application and release portion 12 of the distributing valve device 1 is connected to atmosphere by way of a passage and pipe 184 and an atmospheric port (not shown) in the brake valve device 3. With cylinder 24 vented to atmosphere piston 23 and connected slide valve 25 will occupy the position shown in Fig. 1A, in which brake cylinder device 2 is connected to atmosphere by way of pipe and passage 28, chamber 27 and vent port 29.

It should be understood that in order to effect recharging of the brake pipe 19 not only is it necessary that the handle 182 be in running position but at the same time the pedal 180 of the foot valve device 10 must be held depressed in order to prevent an application of the brakes being effected automatically in a manner hereinafter described.

Fluid under pressure supplied from feed valve devices 171 at brake pipe pressure will also flow through pipe 173, choke 172 and pipe 151 to chamber 169 in the foot valve device 10 and thence past valve 168 into chamber 170, whence it will flow through pipe 139 to chamber 138 in the suppression valve device 8. With the brakes released chamber 132 of valve device 8 will be at atmospheric pressure, as will appear later, and valve device 8 will be positioned as shown in Fig. 1A, in which position fluid under pressure supplied to chamber 138 will flow through bore 143 and chamber 145 to safety control pipe 146 and thence to application valve device 147 and also through a check valve 185 and pipe 186 to a timing reservoir 187.

Fluid supplied to pipe 32 at main reservoir pressure will also flow through chamber 88 in the regulating valve device 5, passage and pipe 81, double check valve 65 and pipe 67 to reservoir 66 and to chamber 64 in the vacuum control valve device 4 where it will act in an upwardly direction on diaphragm 63. At the same time fluid under pressure supplied to passage 81 will flow through choke 80 to chamber 79, where it will act in a downwardly direction on diaphragm 76 in opposition to the action of spring 92. When the pressure of fluid in chamber 79 becomes sufficient to overcome the opposition of spring 92 (preferably approximately 24 pounds), diaphragm 76 will deflect downwardly, thereby permitting spring 89 to actuate slide valve 83 downwardly to a position in which chamber 88 is out of register with the passage 32. Upon a reduction of fluid pressure in chamber 64 and reservoir 66 a corresponding reduction in fluid pressure will be effected in chamber 79, whereupon spring 92 will cause slide valve 83 to move upwardly to repeat the operation just described and thereby maintain a preferred pressure of twenty-four pounds in chamber 64 of the vacuum control valve device 4.

Fluid under pressure supplied to brake pipe 19 will also flow to chamber 40 in vacuum control valve device 4. In response to pressure of fluid thus supplied to chamber 40, diaphragm 39 will deflect downwardly, thereby actuating valve 46 downwardly to a position in which vacuum reservoir 98, which is connected to a vacuum exhauster (not shown), is connected to vacuum train pipe 38 by way of pipe 99, chamber 97 in vacuum release valve device 6, choke 103, chamber 96, pipe 55, chamber 54 in valve device 4, cavity 51 of slide valve 46, annular chamber 52 and branch pipe 53. With the vacuum release valve 100 in its normally seated position as shown in the drawing, the amount of vacuum established in the train pipe 38 will be determined by the flow capacity of choke 103 in valve device 6 which is preferred to be that which is just sufficient to maintain the vacuum in train pipe 38 against train leakage. As a vacuum is established in branch pipe 53, a corresponding degree of vacuum will be established in chamber 57 in valve device 4 connected thereto to such a degree that fluid under pressure in chamber 64 will prevail, moving diaphragm 63 and slide valve 46 upwardly to a position in which passage and pipe 55 are cut off from branch pipe 53 by said valve. In this position of valve device 4 the pressure of fluid in train pipe 38 will have been reduced sufficiently to effect a release of the vacuum brakes on the train in the usual manner.

Service application of brakes

When it is desired to effect a service application of the brakes on the cars and locomotive, the handle 182 of the automatic brake valve device 3 may be moved to service application position, in which brake pipe is vented to atmosphere in the usual, well-known manner described in the aforesaid pamphlet. The reduction in brake pipe pressure thus produced will be communicated through branch pipe 20 to chamber 14 in the distributing valve device 1 and causes the movement of the equalizing piston 13 to application position, in which fluid under pressure will be supplied from pressure reservoir 21 through passage 22, valve chamber 15 and a port 188 in slide valve 16 to passage 184 and application cylinder 24. In response to fluid pressure in cylinder 24, application piston 23 will be shifted to the right, thereby cutting off chamber 27 from the atmospheric passage 29 and then unseating valve 30 against the action of springs 34 and 35. Fluid under pressure supplied to chamber 31 from main reservoir 33 by way of pipe 32 will be permitted to flow to brake cylinder device 2 by way of valve chamber 27 and pipe 28.

At the same time, in the well-known manner, fluid under pressure from the pressure chamber 21, supplied to application cylinder 24 as described above, will also flow to the usual application chamber 184a by way of the passage 184, a port 184b, a cavity 184c in the main slide valve 16 in its application position, and a passage 184d. Such flow of fluid under pressure from the pressure chamber 21 to the application chamber 184a will reduce the pressure chamber pressure as experienced in valve chamber 15 in equalizing portion 11 and will continue until pressure in chamber 15 becomes slightly less than brake pipe pressure in chamber 14. Thereupon, the equalizing piston 13 will move the auxiliary slide valve 17 to a lap position to close off chamber 15 from port 188 and thereby passage 184 to hold pressure of fluid in passage 184, application chamber 184a and application cylinder 24 at an increased pressure proportionate to the reduction in brake pipe pressure in chamber 14. When brake cylinder pressure in chamber 27 at one side of piston 23 in device 1 becomes substantially equal to the pressure thus being held in application cylinder 24, the spring 35 will return the valve 30 into engagement with its seat 36 to terminate supply of fluid under pressure from the main reservoir 33 to the brake cylinder device 2 while slide valve 25 remains positioned to maintain chamber 27, hence the brake cylinder device 2, isolated from the exhaust passage 29 to hold the desired pressure therein.

The reduction in brake pipe pressure, to which the distributing valve device 1 responds as set forth in preceding paragraphs, will also be communicated to chamber 40 in the vacuum control valve device 4, as a result of which the opposing pressure of fluid in chamber 64 will act on diaphragm 63 to move slide valve 46 upwardly to a position in which the vacuum train pipe 38, via pipe 53, is connected to its atmospheric port 50 through cavity 51 and chamber 52 to permit fluid under pressure from the atmosphere to flow into said vacuum train pipe to increase the pressure of fluid therein until same attains a value in accord with the reduction in brake pipe pressure in chamber 40, whereupon, the combined pressure force of chambers 40 and 57 acting on diaphragms 39 and 63 in opposition to the datum pressure in chamber 64, will return valve 46 to a lap position in which chamber 52, hence vacuum train pipe 38, is isolated from chambers 49 and 54, hence from atmospheric and vacuum reservoir passages 50 and 55, respectively, to hold the desired vacuum pressure in train pipe 38.

The increase in pressure in the vacuum train pipe 38, as thus effected, causes an application on the cars of the train in the usual manner.

Release of service application of the brakes

The brakes may be released on the cars and locomotive by moving the brake valve handle 182 to release (or running) position in which brake pipe 19 is again connected to feed valve device 171 in the usual manner for restoring the brake pipe pressure to its normal degree. An increase of fluid pressure in chamber 14 resulting from the increase in brake pipe pressure will act on piston 15 to cause same to move valve 16 to its release position in which it is shown in the drawing. In release position of slide valve 16 application cylinder 24 will be connected to a release pipe 189 by way of passage 184 and a cavity 190 in said slide valve. With a handle 191 of the independent brake valve device 37 in normal release position release pipe 189 will be opened to atmosphere and consequently application cylinder 24 will be vented to atmosphere therethrough. With cylinder 24 vented brake cylinder pressure in chamber 27 will actuate application piston 23 to its release position in which release valve 25 will uncover atmospheric exhaust passage 29 to permit brake cylinder 2 to vent to atmosphere through pipe 28, chamber 27 and passage 29.

The increase in pressure in brake pipe 19 will also be communicated to chamber 40 in the vacuum control valve device 4, as a result of which diaphragms 39 and 63 will deflect downwardly against the constant predetermined pressure in chamber 64, thereby actuating slide valve 46 to the position in which it is shown in the drawing. As hereinbefore described, in this position of valve 46, the pressure in train pipe 38 will be reduced sufficiently to effect a release of the vacuum brakes in the train in the usual manner.

Quick release of train brakes

As previously described, with valve 100 of the release valve device 6 positioned as shown in Fig. 1B, the degree of vacuum maintained in the vacuum train pipe 38 against train pipe leakage is determined by the flow capacity choke 103. After an application of the train vacuum brakes has been effected, a quick release of the vacuum brakes in the train may be obtained by depressing the button 129 of quick release valve device 7. Downward movement of the button 129 acts through the medium of the lever 127 and plunger 124 to close atmospheric passage 130 by contact with valve 119 and to unseat said valve during continued contact. With valve 119 unseated, fluid under pressure supplied from main reservoir pipe 32 to chamber 113 will flow through valve seat member 111, the bore 110, chamber 114, pipe 115, check valve 116 and pipe 117 to charge reservoir 107 whence it will flow through pipe 108 to chamber 106 in release valve device 6. Fluid under pressure thus supplied to chamber 106 will act on piston 105 and through the medium of said piston and stem 104 will unseat valve 100. With valve 100 now unseated vacuum reservoir 98 will be connected to vacuum train pipe 38 through the relatively large opening 101, and fluid at sub-atmospheric pressure will flow from said train pipe, through branch pipe 53, cavity 51, which is connected at this time with passage and pipe 55, chamber 96 in release valve device 6, the relatively unrestricted opening 101 in parallel relation to choke 103, chamber 97 and pipe 99 to vacuum reservoir 98. As the pressure of fluid in chamber 57 acting on diaphragm 63 is gradually reduced as the vacuum (approximately 22 inches of mercury) is restored in train pipe 38, diaphragms 39 and 63 will deflect upwardly, moving slide valve 46 to the release position shown in the drawing. In this position the slide valve 46 still connects pipes 53 and 55 but only sufficiently to maintain the vacuum main pipe 38 against leakage.

The duration of maintaining the quick release position by release valve device 6 will be determined by the length of time after button 21 has been released that it will take for the fluid under pressure supplied to reservoir 107 to flow to atmosphere through pipe 117, choke 118, pipe 115 and presently uncovered atmospheric passage 130 and plunger 124. Of course, if it is desired to maintain quick release position for a longer period of time, button 129 may be depressed again to recharge reservoir 107 to main reservoir pressure.

Emergency application of the brakes

An emergency application of the brakes on the locomotive and train may be effected by moving the brake valve handle 182 to emergency position, in which position automatic brake pipe 19 will be connected to atmosphere by way of the brake valve device 3 in the usual manner, causing an emergency rate of brake pipe reduction. The reduction in brake pipe pressure thus caused takes place at such a rate that fluid under pressure in pressure chamber 21 of the distributing valve device 1 causes equalizing piston 13 to move against the action of a spring 192 to its extreme right-hand position, as viewed in the drawing, moving the main slide valve 16 to its extreme right-hand position so as to uncover a port 193, connecting valve chamber 15 to passage 184 and thereby permitting fluid under pressure in valve chamber 15 to quickly equalize with fluid pressure in application cylinder 24. At the same time the supply of fluid under pressure to passage 184 is augmented by a relatively restricted connection (not shown) through the brake valve device 3 with main reservoir pipe 32 while fluid under pressure in application cylinder 24 above a certain degree of pressure is vented to atmosphere at a relatively restricted rate by way of passage 184, a relatively restricted passage 194 in main slide valve 16, and a passage 195 leading to a safety valve device 196. The flow capacity of passage 194 is so related to the flow capacity of the aforesaid restricted connection to main reservoir through brake valve device 3 that fluid under pressure will exhaust through safety valve 196 at a rate which will limit pressure in brake cylinder device 2 by limiting that in application cylinder 24. However, this pressure will be considerably higher than that obtained by a service application. Although the brake cylinder pressure will be higher than that obtained with a service application, it will nevertheless be less than main reservoir pressure.

In response to fluid pressure thus established in application cylinder 24, piston 23 will be moved to the right, unseating application valve 30 and permitting fluid at main reservoir pressure to flow through passage and pipe 28 to brake cylinder device 2 until brake cylinder pressure slightly exceeds application cylinder pressure, whereupon the piston 22 will move to lap position and seat valve 30.

While an emergency application of the brakes on the locomotive is being effected by venting the fluid pressure brake pipe 19 and making the main reservoir connection as just described, fluid under pressure is also supplied from main reservoir 33 to chamber 64 in vacuum control valve device 4 through pipe 32, brake valve device 3, a pipe 197, double check valve 65 and pipe 67, and fluid under pressure in chamber 40 is vented to atmosphere by way of brake pipe 19. This results in a rapid movement of diaphragms 39, 63 and valve 46 to application position, in which vacuum train pipe 38 is connected to atmosphere through branch pipe 53, chamber 52, cavity 51 in valve 46, chamber 49 and vent port 50. Thus the train vacuum brakes are applied in the same manner as described for making a service application except that the brake application is somewhat faster.

The brake equipment will remain in emergency position until the brake valve handle 182 is moved to release position, when the fluid pressure brake pipe 19 and the vacuum control valve chamber 40 are again recharged. Release of the brakes then occurs in the same manner as previously described under the description of release, the release after an emergency brake application being the same for both train vacuum brakes and the locomotive fluid pressure brakes as after a service brake application.

Independent locomotive brake application

To obtain an application of the brakes on the locomotive independently of those on the train the handle 191 of the independent valve device 37 may be moved to the right as viewed in the drawing, the degree of brake application increasing according to the degree of movement of said handle. As handle 191 is moved to the right, fluid under pressure is supplied by independent brake valve device 37 from main reservoir pipe 32 to application cylinder 24 by way of application cylinder pipe 184 and also to release pipe 189, cavity 190 and passage 184, the two channels of flow providing a rapid rate of increase in fluid pressure in chamber 24. In response to this rapid rate of increase in pressure in cylinder 24 piston 23 will move to the right promptly to unseat valve 30 and permit fluid at main reservoir pressure in chamber 31 to flow to chamber 24 and thence to brake cylinder pipe 28 to effect an application of the brakes on the locomotive at the same rate as pressure in chamber 24 is being increased. It will be understood that the automatic brake valve device 3 will be isolated from brake cylinder control at this time in the usual, well-known manner. As the fluid pressure in chamber 27 equals that in cylinder 24, valve 30 will return to its seat 36, cutting off further flow to brake cylinder pipe 28.

Independent release after independent application

To release the locomotive brakes after an independent application handle 191 may be moved to the left toward running or release position, in response to which fluid under pressure in cylinder 24 will be vented to atmosphere by way of the release pipe 189 to a pressure corresponding to the position of said handle. In response to such reduction in fluid pressure in cylinder 24 fluid under pressure in chamber 27 and connected brake cylinder pipe 28 will be vented a corresponding degree by way of vent port 29. With handle 191 in release position or running position cylinder 24 will be at atmospheric pressure and chamber 31 will accordingly be reduced to atmosphere. Thus pressure in release pipe 189 and brake cylinder pressure may be decreased in small graduations, or completely reduced to atmosphere.

It will thus be seen that independent control of the locomotive brakes may be had without affecting the operation of train brakes since the pressures in brake pipe 19 and train pipe 38 remain unchanged.

Safety control feature

The safety control feature of this fluid pressure and vacuum brake interlock apparatus provides an automatic service brake application of the train vacuum and locomotive fluid pressure brakes if, for any reason, the locomotive operator does not keep the pedal 180 of the safety control valve device 10 depressed. With the pedal 180 depressed as shown in Fig. 1B of the drawings, communication of the chamber 170 to whistle 178 through pipe 176 and choke 177 is closed off by diaphragm 167 engaging valve seat 175. At the same time, diaphragm 167 holds valve 168 unseated, thereby permitting fluid under pressure supplied from feed valve device 171 through pipe 173, choke 172 and pipe 151 to chamber 169 to flow past said valve to chamber 170, and thence through connected passage and pipe 139 to chamber 138 in suppression valve device 8; thence through bore 143, chamber 145 and safety control pipe 146 to application valve device 147, and also to timing reservoir 187 through check valve 185 and pipe 186 to charge same as previously described in connection with initial charging.

When the operator's foot is removed from the pedal 180, said pedal is rocked counterclockwise by action of spring 181, thereby permitting supply valve 168 to be seated by action of spring 174 and to cut off supply of fluid under pressure from feed valve device 171. Upward movement of pedal 180 also permits diaphragm 167 to deflect toward the right hand under the action of spring 174 out of engagement with valve seat 175. With diaphragm 167 out of engagement with the valve seat 175, fluid under pressure in a control chamber (not shown), of application valve device 147, together with fluid under pressure in timing reservoir 187 connected through pipe 186 and a choke 198 to pipe 146, will flow through safety control pipe 146, chamber 145, through bore 143 in valve member 144 and past presently unseated valve 141 in suppression valve device 8, thence through pipe 139, chamber 170, past valve seat 175, through pipe 176, choke 177 and whistle 178 to atmosphere to sound an alarm. If the operator does not immediately depress the pedal 180 again, the pressure of fluid in the control chamber of the brake application valve device 147 will be reduced sufficiently through valve device 10 and whistle 178 to cause said brake application valve device to operate in the usual manner to reduce brake pipe pressure at a service rate of reduction to effect a service application of the fluid pressure brakes on the locomotive. At the same time brake application valve device 147 operates to supply fluid under pressure through a double check valve 199, a pipe 200, a double check valve 201 and a pipe 202 to a power cut-off switch 203 to operate same to cut off the power supply to the locomotive motors. A service reduction in pressure of fluid in brake pipe 19 will of course effect an increase in pressure of fluid in the vacuum train pipe 38 and thereby cause an application of the vacuum brakes of a train at a service rate.

Suppression of a safety control application

It will be noted that during the safety control application effected, as just described, the valve 141 of the suppression valve device 8 was unseated. When a service application of brakes on the locomotive is being effected, fluid under pressure is supplied from the distributing valve device 1 to brake cylinder device 2 by way of pipe 28, and fluid under pressure thus supplied to pipe 28 also flows to chamber 132 in suppression valve device 8. When pressure of fluid in chamber 132 attains a predetermined degree of pressure such as thirty pounds, such fluid pressure acting on diaphragm 131 will deflect said diaphragm downwardly against the action of the spring 140 to actuate valve 141 to its seated position, in which position flow of fluid under pressure from timing reservoir 187 and application valve device 147 through valve device 8 to foot valve device 10, which flow would effect a safety control application of brakes, is cut off. Thus, any time a brake application is effected to a degree determined by the value of the spring 140, the safety control valve device 10 will be rendered incapable of effecting a safety control application of the locomotive and train brakes.

Break-in-two protection feature

The break-in-two protection feature of the train vacuum brakes provides automatic vacuum brake application, whistle warning and power cut-off in the event of the parting of the vacuum train pipe 38, such as might arise from a parting of a hose due to a break-in-two of the train. The break-in-two application thus effected may be suppressed, however, by manual operation of the quick release control valve device 7.

With the brake valve handle 182 in running position the brake apparatus will be charged as previously described in connection with initial charging and vacuum control valve device 4 will be positioned as shown in Fig. 1B of the drawings. In this position, the pressure of fluid in chamber 64 will be maintained at a chosen degree by operation of the regulating valve device 5, against which the brake pipe pressure in chamber 40 will be balanced so as to maintain a corresponding degree of vacuum in chamber 57 and connected train pipe 38. When, for example, a hose connection in the train pipe is parted, this break-in-two will cause an application of the vacuum brakes and also through said train pipe effect an increase in fluid pressure in chamber 57 of the vacuum control valve device 4 connected thereto. The increase of fluid pressure in chamber 57 will cause diaphragm 63 to deflect downwardly, and, through the medium of diaphragm follower 59, actuate the plunger 68 downwardly against the action of spring 73 into contact with spring seat 77. Valve stem 76 will likewise be brought into contact with valve seat 77, thereby unseating valve 74 to permit flow of fluid under pressure supplied to chamber 64 from regulating valve device 5 to flow to chamber 70 and thence through pipe 71 to control chamber 155 of protection valve device 9. When the pressure of fluid in chamber 155 becomes sufficient to overcome the force of spring 165, diaphragm 154 will deflect downwardly, causing valve 159 to close off the connection of chamber 160 to atmosphere by way of bore 161, chamber 157 and vent port 158 and unseating valve 164 against the force of spring 166. With valve 164 unseated fluid under pressure supplied to chamber 163 from main reservoir pipe 32 will flow to chamber 160 and thence to a passage and pipe 204, double check valve device 201 and pipe 202 to power cut-off switch 203. Fluid under pressure thus supplied to pipe 204 will also flow through a choke 205 and a pipe 206 to a whistle 207 to give a warning of the break-in-two to the locomotive operator. The whistle will thus sound the alarm and switch 203 will be operated to cut off the power.

To release a break-in-two brake application after the atmospheric opening in the vacuum train pipe 38 has been closed by repair it is necessary to depress the button 129 of the quick release control valve device 7. As previously described in connection with quick release operation, operation of button 129 will cause fluid under pressure to flow from main reservoir pipe 32 to vacuum release valve device 6 partly by way of pipe 117. Fluid under pressure thus supplied to pipe 117 will also flow to chamber 156 in the protection valve device 9. As the pressure of fluid acting on opposite sides of diaphragm 154 nears equalization, spring 165 will actuate said diaphragm upwardly, thereby seating valve 164 and unseating valve 159, as shown in the drawing. With valve 164 seated further flow of fluid under pressure to whistle 207 and switch 203 is cut off and with valve 159 unseated pipe 204 is connected to atmosphere through chamber 160, bore 161, chamber 157 and then port 158 in condition for normal operation.

Suppression of a break-in-two application

When it is desired to suppress the application of the vacuum train brakes after a train break-in-two occurs and prior to repair of the vacuum train pipe 38 to permit movement of the locomotive and cars connected thereto, the button 129 of the quick release valve device 7 may be depressed to permit main reservoir fluid to be supplied to chamber 105 in release valve device 6 and to chamber 156 in protective valve device 9 as described above in connection with the release of break-in-two application following repair of train pipe 38. This fluid pressure in chamber 156 will be sufficient either to hold diaphragm 154 in its uppermost position or to cause its return to such position against pressure of fluid supplied to chamber 155 from the vacuum control valve device 4 according to how soon button 129 is depressed after occurrence of the break-in-two. At the same time, pressurization of chamber 106 in device 6 causes valve 100 to uncover opening 101 while an auxiliary exhauster (not shown) is started by a switch means (not shown) controlled by the fluid under pressure supplied by device 7 to pipe 117 to increase the rate of exhausting fluid under pressure from the reservoir 98 and train pipe 38 via control device 4 against the leakage incurred by the break-in-two. The degree of vacuum thus maintained in train pipe 38, hence the degree of brake release, will progressively decrease from car to car back through the train to the car on which said train pipe is broken, where the influx of atmospheric air will destroy practically all vacuum and the brakes will be fully applied. With the supply of fluid under pressure from valve device 9 to power cut-off switch 203 thus either forestalled or such fluid under pressure released from said switch after return of device 9 to the position in which it is shown in the drawing, the locomotive may be operated under its own power against the variously braked cars to move the train to a point where repairs to the train pipe may be made.

Summary

From the foregoing, it will be seen that this invention provides a novel and improved interlock apparatus for a combined fluid pressure and vacuum operated brake apparatus in which train brakes are adapted to be vacuum operated and the locomotive brakes are adapted to be operated by the fluid under pressure, either independently or in conjunction with the train brakes. The locomotive fluid pressusse brake equipment may be conditioned through suitable train connections to control the operation of a train of vacuum operated or fluid pressure operated brakes as the case may be. Safety control protection is provided so that a brake application on a train of cars equipped with vacuum operated brakes may be effected if the operator fails to hold the pedal of a foot valve device depressed. Provision is also made for automatic application of the vacuum brakes of a train of cars in the event of a break-in-two of the vacuum train pipe with additional means for suppressing the automatic power cut-off, which accompanies a break-in-two, upon prompt action being taken by the operator to prevent same.

Having now described the invention, what I claim as new and desire to secure by Letters Patent, is:

1. In a locomotive fluid pressure brake equipment, in combination, a fluid pressure brake pipe, a fluid pressure operable brake cylinder device, brake controlling means operative in response to a reduction in brake pipe pressure to supply fluid under pressure to said brake cylinder device and in response to a restoration of brake pipe pressure to release fluid under pressure from said brake cylinder device, a brake valve means operable to control brake pipe pressure, a vacuum train pipe adapted to be maintained at sub-atmospheric pressures, a vacuum reservoir for storing sub-atmospheric pressures, a vacuum control valve device comprising movable abutment means subject to brake pipe pressure and train pipe pressure acting in opposition to a reference pressure and valve means operable by said movable abutment means in response to a reduction in brake pipe pressure to admit fluid under pressure from atmosphere to said train pipe to increase fluid pressure in said train pipe for obtaining an application of train brakes to a degree corresponding to the degree of brake pipe reduction and operable by said movable abutment means in response to a restoration in brake pipe pressure to close the atmospheric communication to said train pipe and to connect said vacuum reservoir to said train pipe to effect a release of the train brakes, a vacuum release valve device having a normal flow communication between said vacuum reservoir and said vacuum control valve device, said vacuum release valve device comprising a passageway having a larger flow capacity than and in by-passing relation to said normal flow communication, valve means normally closing said passageway, and motor means operative in response to fluid pressure to actuate said valve means to an open position, and valve means selectively operable to supply fluid under pressure to said motor means.

2. In a locomotive fluid pressure brake equipment, in combination, a fluid pressure brake pipe, a fluid pressure operable brake cylinder device, brake controlling means operative in response to a reduction in brake pipe pressure to supply fluid under pressure to said brake cylinder device and in response to a restoration of brake pipe pressure to release fluid under pressure from said brake cylinder device, a brake valve operable to control brake pipe pressure, a vaccum train pipe adapted to be maintained at sub-atmospheric pressures, a vacuum reservoir for storing sub-atmospheric pressures, a vaccum control valve device operative in response to a reduction in brake pipe pressure to admit fluid under pressure from atmosphere to said train pipe to increase fluid pressure to said train pipe for obtaining a train brake application to a degree corresponding to the degree of brake pipe reduction and operative in response to a restoration in brake pipe pressure to cut off the atmospheric connection to said train pipe and to connect said train pipe to said vacuum reservoir to effect a release of the train brakes, said vacuum control valve device comprising movable abutment means subject to pressure of fluid in said brake pipe and of fluid in said train pipe acting in one direction and to a reference fluid pressure acting in the opposite direction to said one direction and valve means operable by movement of said movable abutment means in said one direction to connect said vacuum reservoir to said train pipe and operable by movement of said movable abutment means in said opposite direction to disconnect said vacuum reservoir from said train pipe and to admit fluid under pressure from atmosphere to said train pipe, regulating valve means operative to maintain said reference fluid pressure at a constant predetermined degree, a vacuum release valve device interposed between said vacuum reservoir and said vacuum control valve device having a normal flow communication therebetween, said vacuum release valve device comprising a passageway having a larger flow capacity than and in by-passing relation to said normal flow communication, valve means normally closing said passageway, and motor means operative in response to fluid pressure to actuate said valve means to an open position, and valve means selectively operable to supply fluid under pressure to said motor means.

3. In a locomotive fluid pressure brake equipment, in combination, a fluid pressure brake pipe, brake valve means operable to control pressure of fluid in said brake pipe, a vacuum train pipe adapted to be maintained at sub-atmospheric pressures, a vacuum reservoir for storing sub-atmospheric pressures, vacuum control valve means operable in response to a reduction in brake pipe pressure to admit fluid under pressure from atmosphere to said train pipe to increase fluid pressure in said train pipe corresponding to the degree in brake pipe pressure reduction and operative in response to a restoration of brake pipe pressure to cut off the connection of said train pipe to atmosphere and connect said train pipe to said vacuum reservoir, a vacuum release valve device interposed between said vacuum reservoir and said vacuum control valve means having a normal flow communication therebetween, said vacuum release valve device comprising a passageway having a larger flow capacity than and in by-passing relation to said normal flow communication, valve means normally closing said passageway, and motor means operative in response to fluid pressure to actuate said valve means to an open position, and valve means selectively operable to supply fluid under pressure to said motor means.

4. In a locomotive fluid pressure brake equipment, in combination, a fluid pressure brake pipe, a fluid pressure operable brake cylinder device, brake controlling means operative in response to a reduction in brake pipe pressure to supply fluid under pressure to said brake cylinder device, brake valve means operable to effect a reduction in brake pipe pressure, a vacuum train pipe adapted to be maintained at sub-atmospheric pressures, a vacuum reservoir for storing sub-atmospheric pressures, a vacuum control valve device operative in response to a reduction in brake pipe pressure to admit fluid under pressure from atmosphere to said train pipe to thereby increase fluid pressure in said train pipe for obtaining a train brake application to a degree corresponding to the degree of brake pipe reduction, said vacuum control valve device comprising movable abutment means subject to pressure of fluid in said brake pipe and of fluid in said train pipe acting in one direction and to a reference fluid pressure acting in the opposite direction to said one direction and valve means operable by movement of said movable abutment means in said one direction to connect said vacuum reservoir to said train pipe and operable by movement of said movable abutment means in said opposite direction to disconnect said vacuum reservoir from said train pipe and to admit fluid under pressure from atmosphere to said train pipe, regulating valve means operative to maintain said reference fluid pressure at a constant predetermined degree, power cut-off means operable by fluid pressure to disconnect supply of power to the locomotive, protection valve means operable by fluid pressure to supply fluid under pressure to said power cut-off means, and valve means associated with said vacuum control valve device operable by said movable abutment means thereof in response to an excess of train pipe pressure above a certain degree to connect said reference pressure to said protection valve means.

5. In a locomotive fluid pressure brake equipment, in combination, a fluid pressure brake pipe, a fluid pressure operable brake cylinder device, brake controlling means operative in response to a reduction in brake pipe pressure to supply fluid under pressure to said brake cylinder device, brake valve means operable to effect a reduction in brake pipe pressure, a vacuum train pipe adapted to be maintained at sub-atmospheric pressures, a vacuum reservoir for storing sub-atmospheric pressures, a vacuum control valve device operative in response to a reduction in brake pipe pressure to admit fluid under pressure from atmosphere to said train pipe to thereby increase fluid pressure in said train pipe for obtaining a train brake application to a degree corresponding to the degree of brake pipe reduction, said vacuum control valve device comprising movable abutment means subject to pressure of fluid in said brake pipe and of fluid in said train pipe acting in one direction and to a reference fluid pressure acting in the opposite direction to said one direction and valve means operable by movement of said movable abutment means in said one direction to connect said vacuum reservoir to said train pipe and operable by movement of said movable abutment means in said opposite direction to disconnect said vacuum reservoir from said train pipe and to admit fluid under pressure from atmosphere to said train pipe, regulating valve means operative to maintain said reference fluid pressure at a constant predetermined degree, power cut-off means operable by fluid pressure to disconnect supply of power to the locomotive, protection valve means having a movable abutment operable by fluid under pressure at one side of said movable abutment to establish a fluid pressure connection from said brake cylinder device to said power cut-off means, valve means associated with said vacuum control valve device operable by said movable abutment means thereof in response to an excess of train pipe pressure above a certain degree to connect said reference pressure to said one side of said movable abutment, and valve means manually operable to supply fluid under pressure to the other side of said movable abutment to thereby nullify the operation of said protection valve means.

6. In a locomotive fluid pressure brake equipment, in combination, a fluid pressure brake pipe, a fluid pressure operable brake cylinder device, brake controlling means operative in response to a reduction in brake pipe pressure to supply fluid under pressure to said brake cylinder device and in response to a restoration of brake pipe pressure to release fluid under pressure from said brake cylinder device, a brake valve means operable to control brake pipe pressure, a vacuum train pipe adapted to be maintained at sub-atmospheric pressures, a vacuum reservoir for storing sub-atmospheric pressures, a vacuum control valve device comprising movable abutment means subject to brake pipe pressure and train pipe pressure acting in opposition to a reference pressure and valve means operable by said movable abutment means in response to a reduction in brake pipe pressure to admit fluid under pressure from atmosphere to said train pipe to increase fluid pressure in said train pipe for obtaining an application of train brakes to a degree corresponding to the degree of brake pipe reduction and operable by said movable abutment means in response to a restoration in brake pipe pressure to close the atmospheric communication to said train pipe and to connect said vacuum reservoir to said train pipe to effect a release of the train brakes, a vacuum release valve device having a normal flow communication between said vacuum reservoir and said vacuum control valve device, said vacuum release valve device comprising a passageway having a larger flow capacity than and in by-passing relation to said normal flow communication, valve means normally closing said passageway, motor means operative in response to fluid pressure to actuate said valve means to an open position, power cut-off means operable by fluid pressure to disconnect supply of power to the locomotive, protection valve means having a movable abutment operable by fluid under pressure at one side of said movable abutment to supply fluid under pressure to said power cut-off means, valve means associated with said vacuum control valve device operable by said movable abutment means thereof in response to an excess of train pipe pressure above a certain degree to connect said reference pressure to said one side of said movable abutment, and valve means manually operable to supply fluid under pressure to said motor means.

7. In a locomotive fluid pressure brake equipment, in combination, a fluid pressure brake pipe, a fluid pressure operable brake cylinder device, brake controlling valve means operative in response to a reduction in brake pipe pressure to supply fluid under pressure to said brake cylinder device, brake valve means operable to effect a reduction in brake pipe pressure, a vacuum train pipe adapted to be maintained at sub-atmospheric pressures for storing sub-atmospheric pressures, a vacuum reservoir, a vacuum control valve device operative in response to a reduction in brake pipe pressure to admit fluid under pressure to said train pipe to obtain a train brake application to a degree corresponding to the degree of brake pipe reduction, said vacuum control valve device comprising valve means having a release position in which said vacuum reservoir is connected to said train pipe, an application position in which said train pipe is cut off from said vacuum reservoir and opened to atmosphere and an intermediate lap position in which said train pipe is cut off from both said vacuum reservoir and atmosphere, one movable abutment subjecct to brake pipe pressure urging said valve means toward said release position, and another movable abutment subject at one side to train pipe pressure urging said valve means toward said release position and at the other side to a reference pressure for urging said valve means toward said application position, said movable abutment means being responsive to a balance of a reduced brake pipe pressure and an increased train pipe pressure with said reference pressure to actuate said valve means to said lap position, and regulating valve means operative to maintain said reference fluid pressure at a constant predetermined degree.

8. In a locomotive fluid pressure brake equipment, in combination, a fluid pressure brake pipe, a fluid pressure operable brake cylinder device, brake controlling valve means operative in responsive to a service reduction in brake pipe pressure to supply fluid to said brake cylinder device at a degree of pressure corresponding to the degree of service reduction and operative in response to an emergency reduction in brake pipe pressure to supply fluid to said brake cylinder device at a predetermined higher degree, brake valve means selectively operable to effect either a service or an emergency reduction in brake pipe pressure, a vacuum train pipe adapted to be maintained at sub-atmospheric pressures, a vacuum reservoir for storing sub-atmospheric pressures, a vacuum control valve device operative in response to a reduction in brake pipe pressure to increase train pipe pressure to obtain a train brake application to a degree corresponding to the degree of brake pipe reduction, said vacuum control valve device comprising valve means having a release position in which said vacuum reservoir is connected to said train pipe and an application position in which said train pipe is cut off from said vacuum reservoir and connected to atmosphere, one movable abutment subject to brake pipe pressure urging said valve means toward said release position, and another movable abutment subject at one side to train pipe pressure urging said valve means toward said release position and at the other side to a reference pressure for urging said valve means toward said application position, regulating valve means operative to maintain said reference pressure at a constant predetermined degree, and valve means operative as an incident to the operation of said brake valve device to effect an emergency reduction in brake pipe pressure to supply fluid to said other side of said other movable abutment at a pressure greater than said reference pressure to accelerate the movement of said valve means to said application position.

9. In a locomotive fluid pressure brake equipment, in combination, a fluid pressure brake pipe, a fluid pressure operable brake cylinder device, brake controlling means operative in response to a reduction in brake pipe pressure to supply fluid under pressure to said brake cylinder device, a vacuum train pipe adapted to be maintained at sub-atmospheric pressures, a vacuum reservoir for storing sub-atmospheric pressures, a vacuum control valve device operative in response to a reduction in brake pipe pressure to admit fluid under pressure from atmosphere to said train pipe to effect a degree of train brake application corresponding to the degree of brake pipe reduction, said vacuum control valve device comprising movable abutment means subject to pressure of fluid in said brake pipe and of fluid in said train pipe acting in one direction and to a reference fluid pressure acting in the opposite direction to said one direction and valve means operable by movement of said movable abutment means in said one direction to connect said vacuum reservoir to said train pipe and operable by movement of said movable abutment means in said opposite direction to disconnect said vacuum reservoir from said train pipe and to admit fluid under pressure from atmosphere to said train pipe, regulating valve means operative to maintain said reference fluid pressure at a constant predetermined degree, a safety control pipe, an application valve device operative upon a certain rate of reduction in pressure in said safety control pipe to effect a reduction in brake pipe pressure, and a safety control valve means for venting fluid under pressure from said safety control pipe to effect a reduction therein at said certain rate when operating conditions are adverse to safety.

10. In a locomotive fluid pressure brake equipment, in combination, a fluid pressure brake pipe, a fluid pressure operable brake cylinder device, brake controlling means operative in response to a reduction in brake pipe pressure to supply fluid under pressure to said brake cylinder device, a vacuum train pipe adapted to be maintained at sub-atmosphereic pressures, a vacuum reservoir for storing sub-atmospheric pressures, a vacuum control valve device operative in response to a reduction in brake pipe pressure to admit fluid under pressure from atmosphere to said train pipe to effect a degree of train brake application corresponding to the degree of brake pipe reduction, said vacuum control valve device comprising movable abutment means subject to pressure of fluid in said brake pipe and of fluid in said train pipe acting in one direction and to a reference fluid pressure acting in the opposite direction to said one direction and valve means operable by movement of said movable abutment means in said one direction to connect said vacuum reservoir to said train pipe and operable by movement of said movable abutment means in said opposite direction to disconnect said vacuum reservoir from said train pipe and to admit fluid under pressure from atmosphere to said train pipe, regulating valve means operative to maintain said reference fluid pressure at a constant predetermined degree, a safety control pipe, an application valve device operative upon a certain rate of reduction in pressure in said safety control pipe to effect a reduction in brake pipe pressure, a safety control valve means for venting fluid under pressure from said safety control pipe to effect a reduction therein at said certain rate when operating conditions are adverse to safety, and a suppression valve comprising a control chamber and valve means having a normal position in which said safety control pipe is connected to said safety control valve means and operable in response to a predetermined degree of fluid pressure supplied to said control chamber from said brake cylinder device to another position in which said safety control pipe is cut off from said safety control valve means and supplied with fluid at a pressure for maintaining said application valve in its normal inoperative condition.

References Cited in the file of this patent

UNITED STATES PATENTS

| | | |
|---|---|---|
| 1,819,505 | Farmer | Aug. 18, 1931 |
| 1,943,574 | Winter | Jan. 16, 1934 |

FOREIGN PATENTS

| | | |
|---|---|---|
| 290,415 | Great Britain | May 17, 1928 |